United States Patent [19]

Osawa

[11] Patent Number: 5,307,326
[45] Date of Patent: Apr. 26, 1994

[54] CASSETTE ADAPTER FOR SIGNAL PLAYBACK APPARATUS

[75] Inventor: Shoichi Osawa, Chiba, Japan

[73] Assignee: Sony Corporation, Japan

[21] Appl. No.: 871,683

[22] Filed: Apr. 21, 1992

[30] Foreign Application Priority Data

Apr. 30, 1991 [JP] Japan .................................. 3-126926

[51] Int. Cl.⁵ .............................................. H04B 1/20
[52] U.S. Cl. ......................................... 369/2; 369/11; 369/1
[58] Field of Search ............... 369/2, 11, 289, 137, 369/1, 4, 5, 3, 292

[56] References Cited

U.S. PATENT DOCUMENTS

| | | | |
|---|---|---|---|
| 3,946,156 | 3/1976 | Budrose | 369/1 |
| 3,978,524 | 8/1976 | Gordon et al. | 369/1 |
| 4,734,897 | 3/1988 | Schotz | 369/2 |
| 5,161,131 | 11/1992 | Borchardt et al. | 369/2 |

Primary Examiner—Robert J. Pascal
Assistant Examiner—Tan Dinh
Attorney, Agent, or Firm—Ronald P. Kananen

[57] ABSTRACT

A cassette adapter has a cassette which is inserted into a cassette insertion portion of a signal playback device. The cassette is provided with an operation state detection means and a control signal output means. An acoustic device is controlled corresponding to an operation state on the basis of the signal detected with the control signal output means, thereby controlling the operation of the acoustic device in synchronization with the playback device.

10 Claims, 3 Drawing Sheets

CASSETTE ADAPTER FOR SIGNAL PLAYBACK APPARATUS

BACKGROUND OF THE INVENTION

This invention relates to a cassette adapter for a signal playback apparatus. More particularly, the present invention relates to such an apparatus which is suitable for application wherein a compact disc player is connected to an audio cassette tape recorder which is mounted, for example, in a car.

A known construction wherein a cassette adapter, in the form of cassette, is inserted in a cassette insertion port of an audio cassette tape recorder, is disclosed in U.S. Pat. No. 4,734,897. A cable terminal extending from the cassette adapter is connected to an audio output terminal of, for example, a portable compact disc player, thereby supplying an audio signal produced by the compact disc player to the audio cassette tape recorder.

The cassette adapter is provided with an impedance conversion circuit for adjusting the impedance level of the audio signal outputted from the compact disc player and which is fed to a magnetic head on the cassette tape recorder side. Thus the audio signal reproduced by the compact disc player can be heard by means of a cassette tape recorder mounted on the car side.

As is well known, automotive vehicles are usually provided with a so-called ACC power-terminal which is interconnected with an engine ignition switch to control the supply of voltage.

In this prior art arrangement, electric power (e.g. 12 volts) is supplied to the audio cassette tape recorder from the ACC power source, and therefore is controlled in an on/off manner depending on the position of the ignition key.

On the other hand, the compact disc player is provided with its own battery, for example, of the rechargeable type.

Thus, power is supplied to the compact disc player even in the case wherein the ACC power is cut-off to the cassette tape recorder by the manipulation of the ignition key and the associated opening of the engine ignition switch.

Consequently, there is a problem that a battery of the compact disc player becomes completely discharged if the compact disc player is left switched on for a long time.

SUMMARY OF THE INVENTION

In view of the foregoing, an object of this invention is to provide a cassette adapter which is capable of controlling the supply of battery power and the like to a signal generating device.

The foregoing object and other objects of the invention have been achieved by the provision of a cassette adapter 4 having a cassette 4A which can be inserted into a cassette player or deck, and connecting cord parts 40 and 4C, which connect to signal input/output ends 3A and 3B of a signal generating device or unit 3, and through which an audio signal S1 is supplied from a signal generating device 3 on the reproducing apparatus 2. The cassette 4A is provided with an operating state detection means 5, 6, 7, 8, 8A, 9A, 9B for detecting an operating state of the cassette player or deck 2, and control signal output means 10 for outputting a control signal S2 to the signal generating device 3 according to a detection means 5, 6, 7, 8, 8A, 9A, 9B. This allows the signal generating device to be—controlled in synchronism with the operation of the cassette player 2.

The cassette player 2 and the signal generating device 3 are connected by the insertion of the cassette adapter 4 into the cassette insertion port 2A of the player 2. The signal generating device 3 is controlled by generating the control signal S2 using the control signal output circuit 10 in accordance with the operating state of the player 2 as detected by the operating state detection means 5, 6, 7, 8, 8A, 9A, 9B. The audio signal S1 generated from the device 3 is reproduced by the player 2.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
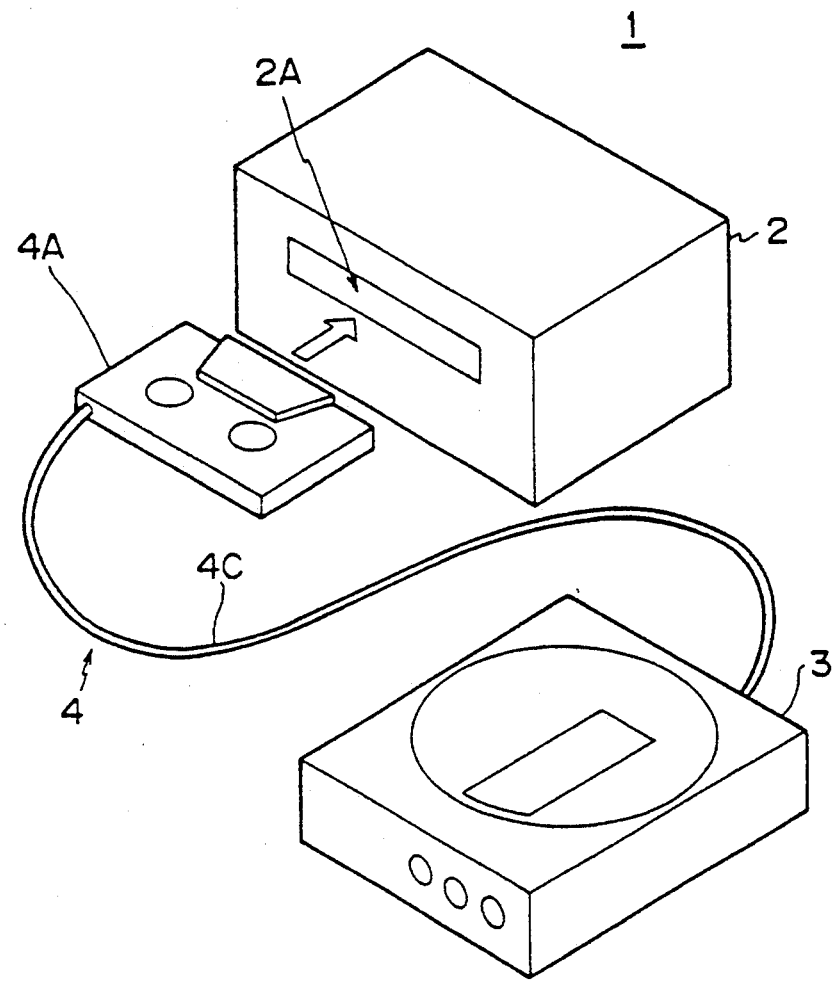
FIG. 1 is a perspective view representing one embodiment of a car audio system using a cassette adapter according to the present invention.

The preferred embodiments of this invention will be described with reference to the accompanying drawings:

In FIG. 1, a reference numeral 1 generally denotes a car audio system, wherein a compact disc player 3 is connected to a cassette tape recorder 2 mounted on a car body by way of a cassette adapter 4.

Battery power is supplied to the compact disc player 3 through a cigarette lighter terminal provided on the car dashpanel, or by a battery which is provided in the compact disc player per se.

In the case of this embodiment, the compact disc player 3 has a remote control terminal (not shown), and is controlled by a control voltage supplied from a remote controller.

When a 2.15 [V] voltage, for example, is supplied from the remote controller, the compact disk player operates for playback, and when a 1.69 [V] voltage, for example, is supplied, it comes to a stop.

Figure 2:
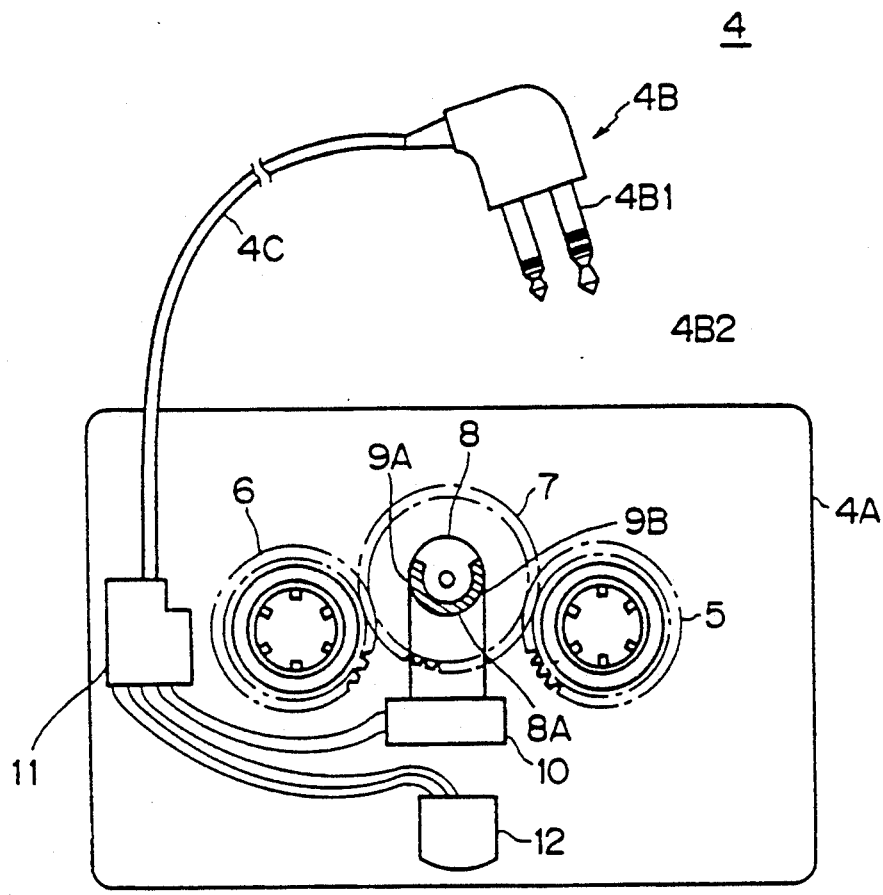
FIG. 2 is a schematic plan view showing details of the cassette adapter construction.

Here, as shown in FIG. 2, the cassette adapter 4 has a cassette 4A and a plug 40, and supplies an audio signal Si provided to an output terminal (not shown) of the compact disc player 3 to the cassette 4A through an audio pin 401 and a cord 4C.

Further, the cassette 4A supplies an ON/OFF control signal S2 in response to the detection of cassette insertion/ejection to and from a cassette insertion port 2A of the cassette 4A. This signal S2 is supplied to a signal input/output terminal 30 of the compact disc player 3 by way of the cord 4C and a control pin 402.

The cassette 4A is provided with reel hubs 5 and 6. Gear teeth are formed on circumferences of the hubs 5 and 6.

A gear 7 is positioned between the hubs 5 and 6. The hubs 5 and 6 are arranged to be in constant drive connection through this gear 7 with each other.

When the cassette 4A is inserted into the cassette tape player 2, the hubs 5 or 6 rotate in synchronism with each other. Thus, damage to the power source of the cassette tape recorder which may occur if only one of hubs 5 and 6, is permitted to rotate, is prevented.

In this instance an undesired rotation detector plate 8 which is smaller in diameter than the gear 7, is mounted coaxially on the gear 7.

Electrically conductive leaf spring-like slider plates 9A and 9B are disposed so as to slidingly engage the circumferential surface of the rotation detector plate 8.

An arcuate electrode plate 8A is provided on a circumference of the rotation detector plate 8 which is made of a non-conducting material.

When both of the slider plates 9A and 9B slidingly contact the electrode plate 8A, a closed is formed. However, when only one of the slider plates make contact with the electrode plate 8A, an open circuit is formed. Thus, on/off switching is carried out in to a rotation of the gear 7, so that a control signal representing whether or not the hubs 5 and 6 are rotating, is formed.

The ends of the slider plates 9A and 9B are connected to a control signal processing circuit 10. The gear 7 is rotated by means of the control signal processing circuit 10, and a pulse signal outputted on the basis of the on-/off operation of the slider plates 9A and 9B is detected.

When the hubs 5 and 6 rotates, the control signal processing circuit 10 supplies the ON control signal S2 of, for example, 2.15 [V] to the compact disc player 3 through an impedance adjusting circuit 11.

The compact disc player 3 is induced to assume an operating condition and begin a playback operation.

Further, when the pulse signal is not detected, the control signal processing circuit 10 determines that the cassette tape recorder 2 is not driven and the gear 7 does not rotate, and generates the OFF control signal S2 of, for example, 1.69 [V].

A playback operation of the compact disc player 3 stops and the power is turned off by means of this OFF control signal S2.

The cassette 4A supplies the audio signal S1 inputted through the audio pin 401 and the cord 4C to a head 12 through the impedance adjusting circuit 11. This causes a signal reproduced by the compact disc player 3 to be supplied to a magnetic head within the cassette tape recorder 2 magnetic-coupled with the head 12 and is outputted from a speaker mounted in the car.

With this arrangement, when it is desired to hear music which is reproduced by the compact disc player 3, the cassette 4A is inserted in the insertion port 2A of the cassette tape recorder 2.

Thus, when the cassette tape recorder 2 is operated in the reproducing mode, the hubs 5 and 6 of the cassette 4A are driven to rotate by the cassette tape recorder 2, and the gear 7 is rotated at a constant speed.

In this case, the rotation detector plate 8 and the electrode plate 8A rotated according to cause a rotation of the gear 7 contact slidingly with the slider plates 9A and 9B to switching operation. The control signal processing circuit 10 detects the pulse signal inputted repeatedly by way of the slider plates 9A and 9B.

Here, the control signal processing circuit 10 determines that a driving power is supplied to the cassette tape recorder 2, and thus supplies a 2.15 [V] voltage to the signal input/output terminal 30 provided on the compact disc player 3.

The compact disc player 3 is switched on and starts reproducing in response to the control signal S2.

In this case the cassette 4A inputs the audio signal S1 reproduced by the compact disc player 3 by way of the output terminal 3A to the impedance modulator 11 through the audio pin 401 and the cord 4C. After subjecting the audio signal S1 to impedance modulation, the cassette 4A supplies it to the magnetic head of the cassette tape recorder 2 through the head 12, which is outputted from the speaker connected to the cassette tape recorder 2.

In the event that the ACC supply is turned off and thus the ACC supply is cut-off from the cassette tape recorder 2, the rotation of the hubs 5 and 6 is stopped. Thus, the rotation detector plate 8 stops rotating, and the pulse signal is not supplied to the control signal processing circuit 10.

Under these conditions, the control signal processing circuit 10 determines that the cassette tape recorder 2 is no longer driven, and supplies a 1.69 [V] voltage signal to the signal input/output terminal 30 provided on the compact disc player 3.

In response to this control signal, the compact disc player 3 stops reproducing and turns the power off. This effectively prevents power from being supplied from the battery to the compact disc player 3 after the ACC supply is turned off.

According to the aforementioned construction, the cassette 4A is inserted in the cassette tape recorder 2, and the rotation of the reel shaft of the cassette tape recorder 2 is monitored by the rotation detector plate 8 and the electrode plate 8A, thereby controlling the supply of power to the compact disc player 3.

Thus, useless consumption of the battery power through the continuous supply of a power to the compact disc player 3 after the supply of the driving voltage to the cassette tape recorder 2 is stopped, is prevented.

Figure 3:
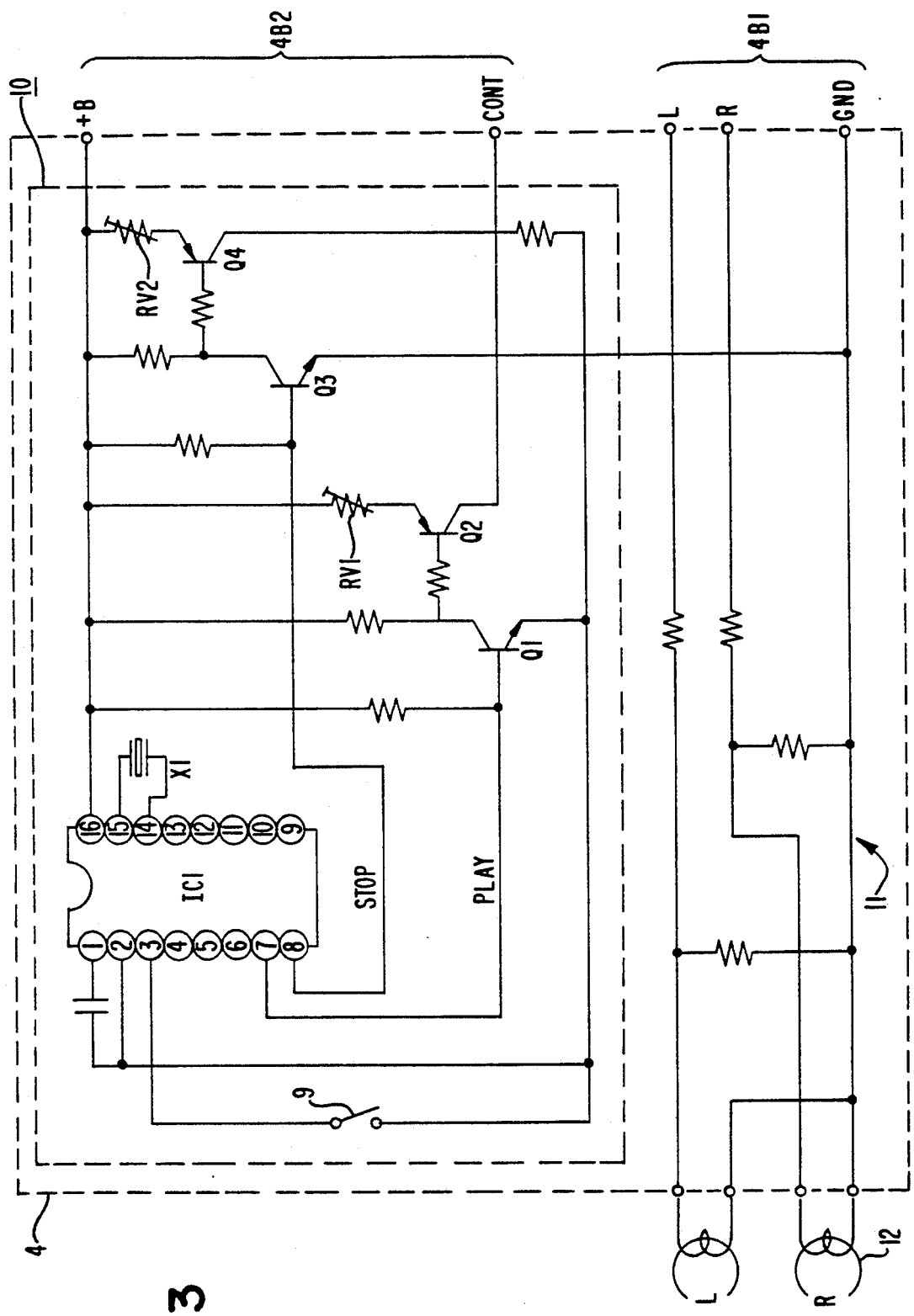
FIG. 3 is a wiring diagram showing the circuit arrangement used in the cassette adapter according to the present invention.

FIG. 3 denotes the circuit construction used in the cassette adapter 4. The audio playback signal obtained from the audio signal playback apparatus including the compact disc player 3, etc. through the audio pin 401 is supplied to the magnetic head 12 through the impedance adjusting circuit ii. Thus, the audio signal reproduced by the audio signal playback apparatus comes to be supplied to the cassette tape recorder 2 through the cassette adapter 4.

A reference numeral 9 denotes a switch composed of slide plates 9A and 9B, the on/off state of which is changed by means of a rotation detection plate rotating with the rotation of the hubs 5 and 6. The output signal of the switch 9 is supplied to an integrated circuit IC1 composed of a four bit-control processing unit. When a pulse signal is supplied from the switch 9, the integrated circuit IC1 renders a transistor Q1 connected to the terminal 7, conductive. As a result, a transistor Q2 is rendered conductive and an on control signal having a voltage level of 2.15 [V] is outputted to a control pin 402.

Further, when the pulse signal is not supplied from the switch 9, the integrated circuit 10 causes the transistor Q1 to become non-conductive while inducing transistor Q3 to become conductive. As a result, a transistor Q4 becomes conductive and the OFF control signal having a voltage level of 1.69 [V] is outputted to a control pin 402.

The signal playback apparatus e.g. the compact disc 3, is therefore controlled in a manner which prevents useless consumption of battery power because of the interlocking with the operation of the cassette tape recorder 2.

In the above-described embodiment, the description has referred to the case where the cassette 4A is inserted in the cassette tape recorder 2 to effect on/off control of a the compact disc player power supply 3. However, the present invention is not necessarily limited thereto, and when operating the cassette tape recorder 2 for fast forwarding or rewinding for example, it is within the scope of the present invention that, the compact disc player may be induced to skip over a track or tracks in response to the detected pulse signal, or may be returned to the beginning if a predetermined track to repeat-play back.

Thus, the compact disk player can be controlled for reproducing by a simple operation on the cassette deck side and without the need to manipulate the control buttons/switches of the disc player.

Further in the above-described embodiment, the description has referred to the case where the supply of the ACC power to the cassette tape recorder 2 is detected from a switching operation produced by the rotation detector plate 8 and the electrode plate 8A and the slider plate 9A or 9B. However the present invention is not necessarily limited thereto, and it is conceivable that a belt is used to connect the hubs 5 and 6, a rotation detection device 15 comprising a conductor and a nonconductor is provided on a circumferential edge portion of one of the hubs 5, 6 and, a pulse signal generated by a switching operation of a conductor or nonconductor portion in a manner similar to the rotation detection member 15 and the slider plates 9A and 9B.

Still further, in the above-described embodiment, the description has referred to the case where the supply of power to the compact disc player 3 is controlled after the cassette 4A is inserted. However, the present invention is not necessarily limited thereto, and hence the compact disc player 3 may be subjected to on/off control in response to the actual extraction/insertion of the cassette 4A from/to the cassette tape recorder 2.

In this case, in the instance where the cassette 4A is extracted from the cassette tape recorder 2, a pulse signal is not inputted to the control signal processing circuit 10 and, therefore an advantage similar to that described above may be obtained.

In the above-described embodiment, the rotation detector plate 8 and the electrode plate 8A are mounted coaxially with reference to the gear 7, and control information is detected from a switching operation of the slider plates 9A and 9B and the conductive member, however, the present invention is not necessarily limited thereto.

Further in the above-described embodiment, the compact disk player 3 is controlled on or off by the cassette 4A. However the present invention is also not necessarily limited thereto, and is applicable to the case where the power to an acoustic instrument having a remote control function such as a digital audio tape recorder of the like, is turned on or off.

While only the preferred embodiments of the invention have been disclosed, it will be obvious to those skilled in the art that various changes and modifications may be made therein without departing from the scope of invention, which is limited only by the appended claims.

What is claimed is:

1. A cassette adapter for use with a cassette player and an audio signal playback apparatus provided with an audio signal output terminal and an external control terminal comprising:
    coupling means for coupling said audio signal playback apparatus with said cassette player and for transferring audio signal therebetween;
    signal transferring means for transferring signals between the audio signal playback apparatus and the cassette player;
    operation detecting means, including a rotatable hub, for detecting the operation mode of the cassette player; and
    control signal generating means, operatively coupled with said operation detecting means, for generating a control signal which is supplied by way of said signal transferring means to the external control terminal of said audio playback apparatus for automatically controlling the operation of said audio signal playback apparatus in synchronization with the operation of said cassette player.

2. The cassette adapter according to claim 1, wherein said operation detecting means generates a signal when said hub is rotated in conjunction with the operation of said cassette player.

3. The cassette adapter according to claim 1, wherein said control signal stops said audio signal playback apparatus when said cassette player is inactive.

4. The cassette adapter according to claim 1, wherein said control signal switches off said audio signal playback apparatus when said cassette player is inactive.

5. The cassette adapter according to claim 1, wherein said transferring means comprises a cable which extends from said cassette adapter body and a connector to connect with the audio signal output terminal and the external control terminal of said audio signal playback apparatus.

6. The cassette adapter according to claim 1, wherein said coupling means further comprises transducing means for establishing a magnetic coupling with a magnetic head of said cassette player.

7. An adapter arrangement for operatively interconnecting a cassette player and a separate source of audio signal, comprising:
    a cassette-shaped body which can be inserted into the cassette player in lieu of a cassette;
    transducer means, disposed in said cassette shaped body, for establishing an operative connection with a play head of the cassette player;
    control signal generating means, disposed in said cassette shaped body and responsive to the operation of said cassette player, for generating a control signal which is indicative of the mode of operation of the cassette player and which is used for controlling the mode of operation of the separate source of audio signal so that the mode of operation of the separate source of audio signal changes synchronously with a change in cassette player mode; and
    cable means, including a connector which can be plugged into the separate source of audio signal, for transferring an audio signal from the separate source of audio signal to said transducer means and for transferring said control signal from said signal generating means to the separate source of audio signal.

8. An adapter arrangement according to claim 7, wherein said control signal generating means comprises:

first and second hubs which are rotatably supported in said cassette-shaped body and which are operatively connected so as to rotate synchronously with another;

a rotatable member which is operatively connected with said first and second hubs; and electrode means coupled with said rotatable member for producing pulses in response to the rotation of said rotatable member.

9. An adapter arrangement according to claim 7, wherein said connector includes first and second essentially parallel pins which are arranged to be received in an audio signal output terminal and an external control terminal, respectively, of the separate source of audio signal.

10. An adapter arrangement according to claim 7, wherein the separate source of audio signal comprises a compact disc player.

* * * * *